(No Model.)

J. A. HAGAN.
CAR WHEEL.

No. 294,996. Patented Mar. 11, 1884.

WITNESSES
Wm A. Skinkle
Henry A. Lamb

INVENTOR
John A. Hagan
By his Attorneys
Baldwin Hopkins, & Peyton.

(No Model.)  2 Sheets—Sheet 2.

J. A. HAGAN.
CAR WHEEL.

No. 294,996. Patented Mar. 11, 1884.

WITNESSES
Wm A. Skinkle
Francis D. Shoemaker

INVENTOR
John A. Hagan
By his Attorneys
Baldwin, Hopkins, & Peyton

United States Patent Office.

JOHN A. HAGAN, OF THREE RIVERS, MICH., ASSIGNOR, BY MESNE ASSIGNMENTS, TO THE HAGAN STEEL CAR WHEEL COMPANY, OF SAME PLACE.

CAR-WHEEL.

SPECIFICATION forming part of Letters Patent No. 294,996, dated March 11, 1884.

Application filed October 24, 1883. (No model.)

*To all whom it may concern:*

Be it known that I, JOHN A. HAGAN, of Three Rivers, in the county of St. Joseph and State of Michigan, have invented certain new and useful Improvements in the Manufacture of Car-Wheels, of which the following is a specification, reference being had to the accompanying drawings, in which—

Figure 1:
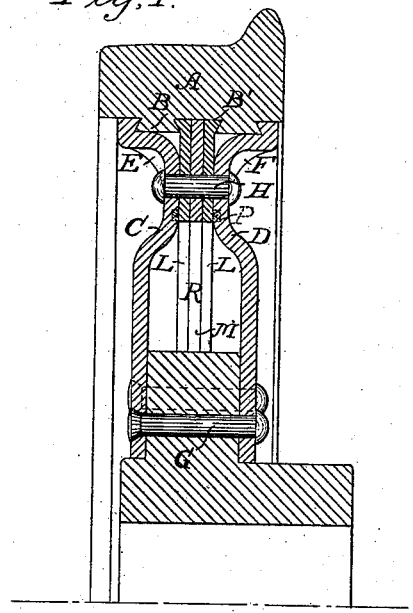

Figure 1 is a radial section of my improved car-wheel; and Figs. 2, 3, 4, and 5 are similar radial sections, showing slight formal modifications, all involving in substance the same improvements.

My invention relates to that class of car-wheels in which the tire and body of the wheel are constructed separately and afterward secured together; and the objects of the invention are to construct a first-class car-wheel of great strength, and particularly, first, to so construct the tire that it can at a moderate expense be so securely attached to the body of the wheel that in case of fracture of the tire it cannot become detached; second, to so construct the body of the wheel that the portion forming the tire-seat will possess sufficient elasticity to prevent the tire becoming loose when it is heated and expanded by applying the brakes; third, to so construct the body of the wheel that it will not be cracked or strained by the expanding of the axle from hot journals; fourth, to so construct the wheel-body that a tire may be quickly and cheaply attached or removed.

For the purpose of securely attaching the tire to the body of the wheel, the tire is formed with annular grooves in the inner portion of its sides of dovetail, tongue-and-groove, or equivalent section. The annular projection thus formed by preference constitutes the seat of the body of the wheel, and in or about the center of its inner surface is an annular groove also of dovetail, tongue-and-groove, or equivalent section.

I am aware that tires have been formed with annular grooves in their sides for the purpose of securing them to the body of the wheel. I am also aware that rings projecting from the inner surfaces of tires have been employed for the same object, and I claim neither, broadly.

For the purpose of strengthening the wheel and more securely attaching the tire to the body of the wheel, my tire is provided with an internal ring or web, preferably made in sections or different annular plates, as illustrated, (although this construction of ring is not claimed by me in this application,) and having a dovetail, tongue-and-groove, or equivalent section adapted to fit into the annular groove in the inner surface of the inward annular projection of the tire.

In my improved car-wheel the body of the wheel is preferably formed in two parts, each with projections corresponding in shape and dimensions to the grooves in the sides of the tire, and when the parts forming the body of the wheel are secured together these projections interlock with the tire projection and prevent the tire from flying off in case of fracture. The elasticity required to hold the tire securely when it is heated and expanded by the action of the brakes is obtained by constructing the plates forming the wheel-body with projecting rims, which are slightly compressed when the tire is forced to place, and provision is made for the expansion of the axle by the dish shape of the central portion of the plates forming the wheel-body.

Figure 2:
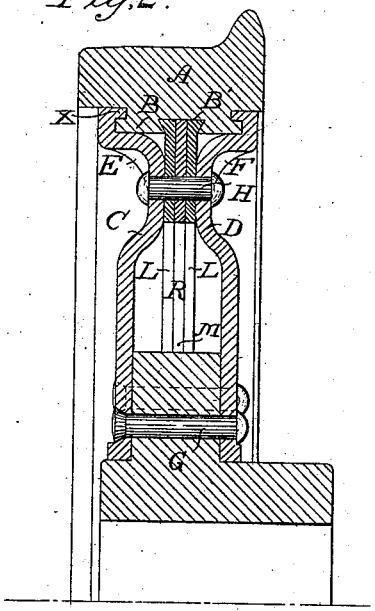
Figure 3:
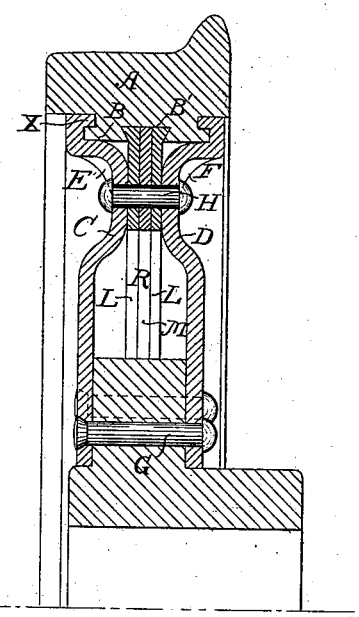
Figure 4:
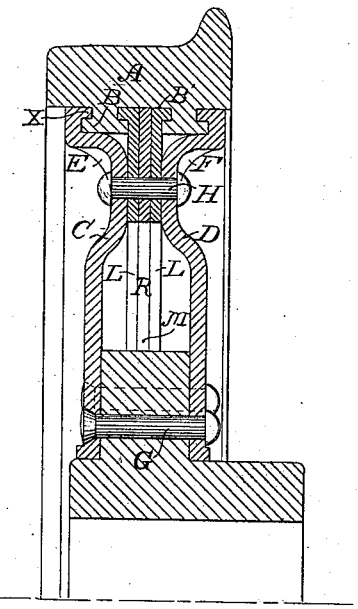
Figure 5:
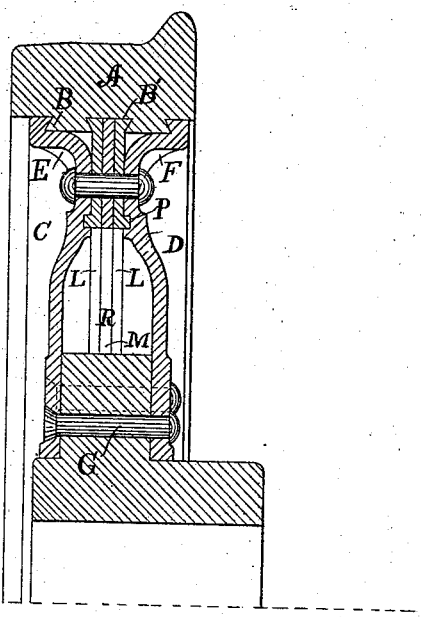

Referring to the letters on the drawings, it will be seen that my improved wheel consists of the tire A, preferably of forged steel, formed with the annular projection B, having its sides of dovetail or tongue-and-groove outline, Figs. 1 and 5 showing the dovetail, and Figs. 2, 3, and 4 showing the tongue-and-groove form.

In or about the center of this annular inward projection of the tire is an annular groove, B', of dovetail section, as shown in Figs. 1, 2, 3, and 5, and of tongue-and-groove section, as shown in Fig. 4, these two forms, wherever they occur in the construction of my wheel, being the same in substance and practical effect. Within this groove B' the ring R is inserted.

C and D are disks, either of which may or may not have a portion or all of the hub integral therewith. They are preferably of cast-steel; but they may be of wrought-iron, or of malleable cast-iron, or of the cast-iron commonly used for car-wheels. The forms of these disks may be varied; but I prefer the form shown. Their flanged rims form a seat for the tire, and the return-flanges of the rims form annular projections or rings X, which enter the annular grooves in the edges of the annular projection of the tire. The projecting rims are strengthened by the brackets E F. Where the hub is separate from the disks, a portion of the hub extends radially outward a sufficient distance, so that the bolts G may pass through solid metal. In Fig. 3 I show the disks made in two parts, which is only a formal modification.

H indicates bolts or rivets passing through the side plates and the ring R, and securing them together. In Fig. 5 I show annular projections P on the sides of the ring R, which enter into corresponding annular grooves in the disks, and serve to better connect the disks and ring. The circular pieces L, forming the sides of the ring, not having their ends welded or otherwise joined in the groove of the tire, but merely being in contact, may be inserted in place by overlapping their ends sufficiently and then springing the circular pieces into place in the dovetail groove in the tire. The central piece or key, M, is then afterward put in in a similar manner, which forces the side pieces to fit snugly in the dovetail portions of the groove. The ends of the key may be cut tangentially, if desired, or in the line of a suitable curve, so that the key may be made to fill the entire space in the tire-groove between the side pieces; or the ring may be put in in segments, if desired. The foregoing is the simpler and the preferred method of building up the ring within the groove of the tire; but there are other methods. In each set of sections forming one-third of a ring there may be one piece cut tangentially at both ends, and the adjoining pieces may be correspondingly cut at one end, to enable the ring to be readily built up. Each plate or third of the ring may be composed of two or more segmental pieces, as may be desired, and the ring may be built up in place in the way suggested, or otherwise, as preferred.

The manner of manufacturing my improved car-wheel is as follows: The tire is formed by forging or casting in any usual manner, and its inner face and the annular grooves are made true by turning or otherwise. The castings or forgings forming the side plates are then bored and turned or otherwise made true, and the holes for the bolts are drilled. The disks or side plates are then forced by hydraulic pressure or otherwise into place in the tire, the inner portions of the rims fitting the annular projections of the tire, and the return-flanges entering the corresponding grooves in their sides. Finally, the bolts G and H are put in place, which completes the wheel. The return-flanges of the side plates and the ring will hold the tire securely in case of its fracture, and the return-flanges, being formed integral with the plates, cannot become loose. The ring serves to strengthen both the tire and body, and to improve the wheel.

I do not limit myself to the exact construction just described, as one side plate might be dispensed with, and the annular web or ring bolted or otherwise secured to a single plate; or a single side plate might be used, combined with one or two annular rings; or a tire having an annular web or ring integral therewith might be used, combined with my improved side plates or with the rings above named, although all these methods of construction are greatly inferior in strength and security to my improved wheel, as above described.

Having thus described my invention, what I claim as new, and desire to secure by Letters Patent, is—

1. A tire for a car-wheel, having an inserted ring in its inner face, and grooves of dovetail, tongue-and-groove, or equivalent sectional form in its sides, substantially as set forth.

2. The combination, with a tire for a car-wheel, having an inserted ring in its inner surface and grooves in its sides, of side plates or disks forming the body of the wheel, substantially as set forth.

3. The combination, with a tire for a car-wheel, having an inserted ring in its inner surface and grooves in its side, of side plates or disks with rims curving outwardly, and with return-flanges interlocking with the grooves in the sides of the tire, substantially as set forth.

4. In a car-wheel, the combination, with side plates or disks having flanged rims or rims curving outwardly, of brackets supporting said rims, substantially as set forth.

5. The combination, with a tire for a car-wheel, having a ring inserted and secured in its inner surface, of side plates or disks recessed or grooved to interlock with projections on the sides of the inserted ring, substantially as set forth.

6. In a car-wheel, the combination of the tire having annular grooves in its sides, and the body of the wheel composed of one or more disks, the same being flanged at the periphery for the purpose of forming a tire-seat, of a ring or rings on the wheel-body, and formed so as to interlock with the grooves in the sides of the tire, substantially as set forth.

7. In a car-wheel, the combination of the tire having annular grooves in its sides and an annular ring in its inner surface, with a wheel-body composed of one or more disks, the same being flanged at the periphery for the purpose of forming a tire-seat, of a ring or rings on the wheel-body, and formed so as to interlock with the grooves in the sides of the tire, substantially as set forth.

8. In a car-wheel, the combination, with the tire having an annular web or ring in its inner surface and annular grooves in its sides, of dovetail or tongue-and-groove sectional form, of side plates or disks forming the body of the wheel, with rims curving outwardly from the annular web or ring and forming the tire-seat, and having return-flanges interlocking with the annular grooves in the sides of the tire, and securing the tire to the wheel-body, substantially as set forth.

In testimony whereof I have hereunto subscribed my name this 9th day of October, A. D. 1883.

JOHN A. HAGAN.

Witnesses:
SAM L. WHITESIDE,
O. P. SLOTE.